April 22, 1958     W. M. HOWE     2,832,067
ELECTRIC IMPULSE RESPONSIVE DEVICE

Filed May 27, 1955     2 Sheets-Sheet 1

Inventor:
William M. Howe
by, Richard E. Hosley
His Attorney

Inventor:
William M. Howe
by, Richard E. Horley
His Attorney

United States Patent Office 2,832,067
Patented Apr. 22, 1958

2,832,067

ELECTRIC IMPULSE RESPONSIVE DEVICE

William M. Howe, Marblehead, Mass., assignor to General Electric Company, a corporation of New York Application May 27, 1955, Serial No. 511,688

8 Claims. (Cl. 340—203)

This invention relates generally to electric impulse responsive devices and more particularly to such devices that are adapted to continuously receive impulses from a suitable impulse generating device, to continuously transmit all impulses received to a suitable impulse actuated mechanism, and to delay transmission of pulses for a recurring predetermined interval of time.

In many impulse responsive systems it is very important that all impulses generated are properly accounted for and transmitted to the final end device without loss of a single impulse; otherwise, such systems could not be relied upon to accurately perform any measuring or control function. For example, in the art of kilowatt demand metering, wherein it is desirable to print a record of the demand measured in any predetermined demand interval, it is essential that no impulses be lost during the printing and resetting steps of the measuring cycle. It is to be remembered that impulses are continuously generated by a suitable impulse generating device and such impulses are continuously transmitted to the printing device for the purpose of indication and recording. If the entire system is to function properly, such impulses transmitted must ultimately be delivered to the recording devices and in the proper demand interval.

In the past it has been customary to design printing devices that could accommodate as many as 300 impulses in any predetermined demand interval whether such interval be of 15 minutes', 30 minutes', or 60 minutes' duration. With impulses generated at a rate as high as one impulse per second, it is readily apparent that any impulse actuated mechanisms, such as a printing device, must perform its function in less than a second to prevent the loss of any impulses generated. Now if for any reason it is desirable to use any impulse actuating devices that require a time interval for actuation greater than the shortest time interval between successive impulses, it is apparent that such a system could well lose one or more impulses in each demand interval. Moreover, if the generating rate is materially increased so that the shortest time interval between successive impulses is less than a second, existing actuating devices that are quite capable of handling impulses at a rate no greater than one per second immediately become ineffective to handle impulses coming in at a higher rate.

Accordingly, it is an object of the present invention to provide impulse responsive means for an impulse network in which the probability of losing impulses during operation of the system is greatly minimized and for all practical purposes is eliminated.

It is a further object of the invention to provide impulse responsive means that not only in a practical sense eliminates the possibility of losing any impulses during operation of the system but further insures that all impulses generated are allocated to their proper demand interval.

It is another object of the invention to provide impulse responsive means that is particularly adaptable to a kilowatt demand measuring system and is operative in such a way that all impulses generated by the system are transmitted to suitable printing and recording devices without the loss of a single impulse, with all impulses properly allocated to each demand interval.

Briefly stated, the invention comprises a device that is adapted to continuously receive all impulses generated by suitable impulse generating means, to continuously transmit all impulses received during the demand interval and to delay transmission for a predetermined interval of time at the beginning of any demand interval to allow for proper actuation of a suitable printing device. The impulse responsive means is further adapted to permit release of all impulses delayed at the beginning of the cycle while at the same time continuously transmitting impulses that are received along with the impulses that have been previously delayed.

The invention further comprises the use of relatively conventional components but rearranged in a novel and unique way to accomplish the objects set forth above. Thus, a conventional three-wire double contact switching device is used as an integral part of the impulse receiving means and another conventional three-wire double contact switch device is used as an integral part of the impulse transmitting means. Both the receiving and transmitting means also include motor means that are adapted to actuate the three-wire double contact devices and are further adapted to actuate, through a suitable differential mechanism, impulse storing means. The impulse storing means includes as an integral part thereof a control switch adapted to control the actuation of the impulse transmitting means, in conjunction with a suitable clock actuated switch, whereby accurate demand measuring is achieved without the loss of a single impulse.

Normally, as each impulse is received by the impulse receiving means, it is stored in the impulse storing means and the control switch is actuated to start the impulse transmitting means whereby an impulse corresponding to the impulse received is transmitted to the end device of the system. Each time the impulse transmitting means is actuated to transmit an impulse, it also returns the impulse storing means to its original position and de-energizes itself in so doing. This sequence is repeated continuously at spaced intervals throughout the demand interval and at the end of the interval a clock controlled switch interrupts further transmission of impulses from the device; at the same time, the clock controlled switch prevents further actuation of the transmitting motor means to permit continuous storage of impulses in the device for a predetermined time interval.

During the impulse storing interval, a suitable printing device may be actuated to print the demand during the preceding interval, to reset itself to a zero position, and to print the zero position—all in readiness for the next demand interval. At the end of the impulse storing interval the clock controlled switch restores the device to its normal operating condition, thereby allowing all stored impulses to be successively transmitted to the printing device simultaneously with any new impulses being generated while the stored impulses are being released. With proper design of the various parts making up the complete device, it is possible to handle impulses being generated at widely varying rates without the loss of a single impulse. It is also possible to have a considerable degree of flexibility in the selection of a suitable time interval for printing or other actuation. That is, the impulse storing interval can be varied considerably to accommodate the requirements of any particular system.

The aforementioned objects of the invention, together with the benefits and advantages attendant therewith, will be readily apparent upon reference to the detailed description of the invention set forth below, particularly when taken in conjunction with the drawings annexed hereto, in which.

Figure 2:
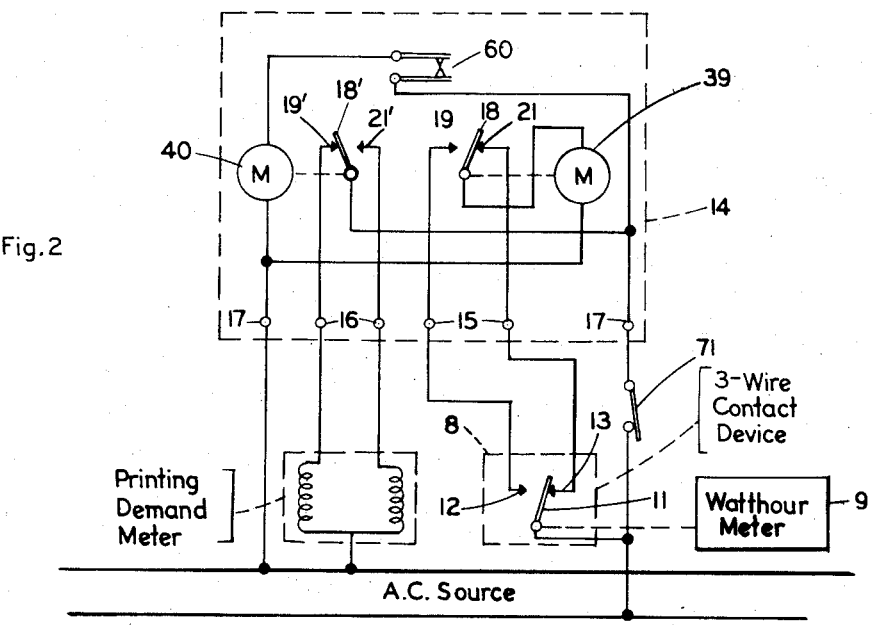
Figure 2 is a simplified circuit diagram showing the internal wiring of the novel impulse responsive means, together with a simplified diagram showing one form of impulse generating means and one form of impulse actuating means.

Referring first to Figure 2 of the drawings, it is to be noted that the impulse generating means of the overall system is in the form of a three-wire double contact device 8 actuated by a suitable watthour meter 9. The single pole 11 of the three-wire device moves in sequence from one contact 12 to the other 13 in response to rotation of the watthour meter, whereby an impulse is generated for each contact closure.

The impulse responsive device forming this invention is shown generally at 14 and includes the impulse receiving terminals 15, the impulse transmitting terminals 16, and the supply terminals 17. Connected to the terminals 15 is another three-wire double contact device forming a part of the impulse receiving means having its single pole 18 adapted to alternately make with one or the other of the contacts 19, 21 in response to operation of a first motor means 39 arranged to be energized through its associated contact device in response to impulses received thereby. In this connection, it is to be noted that when pole 11 makes with contact 13, the pole 18 makes with contact 21, thereby completing a circuit through the motor means 39 which, in a manner described below, causes the pole 18 to break contact with 21 and make contact with 19, thereby de-energizing the motor means until the next impulse is generated by the watthour meter. This next impulse is generated when the pole 11 is driven from contact 13 to contact 12, thereby completing the energizing circuit for the motor means, whereupon the pole 18 makes with contact 21, breaks with 19, after which it is again de-energized. Assuming for a moment that the impulses are being generated at a relatively fixed rate, which may be as low as one for every 18 seconds of operation of the watthour meter, it is apparent that the motor 39 is normally energized once every 18 seconds.

Figure 1:
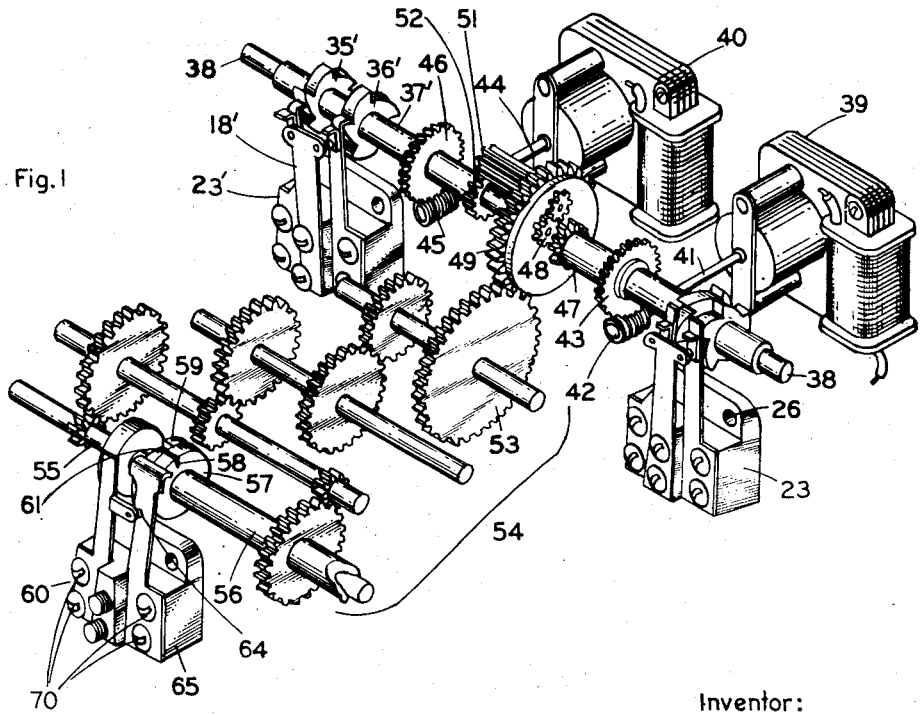
Figure 1 is a perspective view of somewhat schematic mechanical arrangement of the invention.
Figure 3:
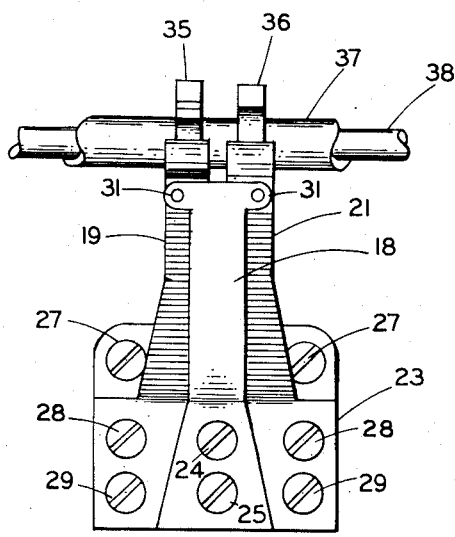
Figure 3 is a partial view of the invention, showing in front elevation the three-wire double contact device forming a part of the impulse receiving means and shown to the right of the arrangement shown in Figure 1.
Figure 4:
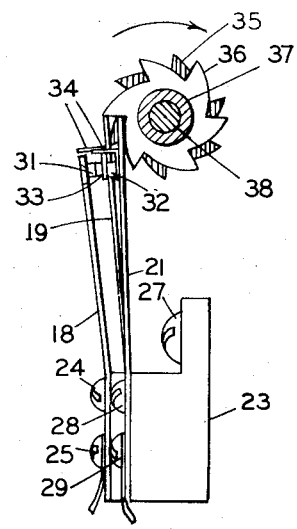
Figure 4 is an end view of the arrangement shown in Figure 3.

Both of the aforementioned three-wire double contact devices are well known in the art and their manner of operation is understood by those skilled in the art. Since their exact form may vary somewhat without any change in operating principle, the form used for the impulse receiving means is shown in Figures 1, 3 and 4. Referring first to Figures 3 and 4, it is to be noted that single pole 18 is in the form of a flexible spring blade having one end securely attached to a terminal block 23 by means of suitable screws 24, 25. The block 23 may be molded of some suitable plastic insulating material and the screw 25 may also be used as a terminal to permit connection of a suitable lead thereto. The block 23 is provided with suitable apertures 26 (see Figure 1) adapted to receive suitable fastening means, in the form of screws 27, so that it may be securely mounted in a main supporting frame on which all parts of the device are mounted. It is to be noted that the main frame has not been shown in any of the drawings and has been omitted therefrom for the sake of clarity and in the interests of brevity.

The contacts 19, 21 comprise a pair of flexible spring blades also mounted on the block 23 by any convenient means such as the screws 28, 29. As with screw 25, the screws 29 may also serve as terminals for the contacts by which suitable leads may be connected thereto. In Figure 4 the block 23 is shown to have a central platform on which the blade 18 is mounted between a pair of shoulders on which the blades 19 and 21 are mounted. This arrangement provides a simple method of insulating all of the blades of each other.

The outer extremity of the blade 18 is provided with a pair of separated contact buttons 31 arranged to cooperate with similar buttons 32, 33 mounted respectively on the blades 21, 19. A pair of similar L-shaped arc retarding members 34 are suitably affixed to the blades 19, 21 on which the contact buttons 32, 33 are mounted.

Cooperating with the three-wire double contact device are a pair of spaced similar five-star cams 35, 36 which are rigidly affixed to a sleeve 37 journaled for rotation on the bearing rod 38 and adapted to be rotated by the motor means forming a part of the impulse receiving means. As is best shown in Figure 4, these cams are offset with respect to one another so that the points of one star cam are between the points of the other star cam.

As these star cams rotate, the contacts 19, 21 are sequentially opened and closed but it is important to note that the configuration of the star cams is such that neither contact will open until the other one has closed.

Moreover the motor 39, its associated driving gears and the arrangement and design of the star cams and associated flexible spring blades is such that for each impulse received, the cams will be indexed but one position, that is, one set of the contacts will be opened and the other set will be closed.

Figure 7:
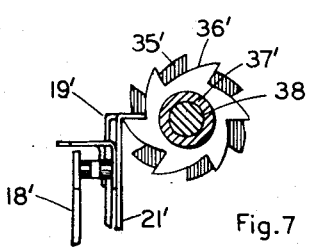
Figure 7 is an end view of the three-wire double contact device forming a part of the impulse transmitting means, and shown on the left-hand side of the arrangement shown in Figure 1.

The impulse transmitting means also includes a three-wire double contact device similar in all respects to the three-wire double contact device forming a part of the impulse receiving means, except for the configuration of the outer extremities of the contacts. Referring to Figures 1 and 7, it is noted that the impulse transmitting three-wire double contact device comprises the single pole 18' in the form of a flexible spring blade similar to blade 18 and mounted on a plastic insulating block 23' similar to block 23. The mounting arrangements for blade 18' and block 23' are identical to the arrangements for the blade 18 and block 20, and further description has been omitted for the sake of brevity; likewise the star cams, and the sleeve and rod bearing on which they are mounted are similar to their corresponding parts in the impulse receiving means and no additional descriptive matter is necessary. Additionally, the blade 18' and the contacts 19' and 21' have buttons mounted thereon to form the contact surfaces, in a manner similar to the arrangements for the receiving means, but the contact blades 19', 21' have their outer ends turned at right angles facing the star cams to accommodate rotation of the star cams in a direction reverse to that for the cams associated with the impulse receiving means. Were the impulse transmitting three-wire double contact device mounted on the opposite side of shaft 38 it could be identical to the three-wire double contact device used with the impulse receiving means. However, for convenience and accessibility, both contact devices are mounted on the same side of the shaft, and the slight change in configuration of parts 19', 21' was necessary to accommodate this arrangement. The mode of operation of the impulse transmitting three-wire contact device is identical with the mode of operation of the impulse receiving three-wire contact device, except that energization of the motor means driving the transmitting contact device is not through the contacts being driven, but rather is independent thereof, as will be set forth in greater detail below.

Coming back to the impulse receiving means, it is noted that the driving motor 39 is provided with an outer shaft 41 on which is mounted a suitable worm gear 42 meshing with the spiral gear 43 rigidly mounted upon sleeve 37. Rotation of the motor drives the gear 43 and rotates the sleeve 37 to actuate the three-wire contact device. The motor may be the well known Telechron synchronous motor and further description thereof is unnecessary as such motors are well known in the art and their operation is understood without further explanation. The second motor means 40, forming a part of the transmitting means, is also a Telechron synchronous motor operating in the known manner to drive through its shaft 44 the worm gear 45 which in turn drives the worm wheel 46 affixed to sleeve 37'. The cams 35', 36', being rigidly secured to the sleeve 37', are rotated therewith to actuate the transmitting three-wire double contact device.

The sleeve 37 has securely mounted on its inner end a driving pinion 47 meshing with the sun gear 48 forming a part of a simple differential mechanism responding to rotation of the motor means. Gear 48 is journaled on a large gear 49 which in turn is journaled for rotation on the bearing rod 38. Also journaled for rotation on gear 49 is the pinion 51 having a portion thereof on both sides of the face of gear 49. The portion of pinion 51 on one side of gear 49 engages sun gear 48, and the portion on the other side of gear 49 engages pinion 52, mounted on sleeve 37' and driven by motor 40. Meshing with the gear 49 is a gear 53, forming a part of a gear train indicated generally at 54, suitably journaled for rotation in the main supporting frame carrying the rest of the parts of the device. The gear train 54 includes a pair of separate output shafts 55, 56 driven at different rotative speeds in response to rotation of gear 53.

Shaft 56, which is in the form of a sleeve rotatably mounted in shaft 55, has mounted thereon at its inner extremity a cylindrical cam 57 having a transverse slot 58 extending across a portion of its peripheral surface. The shaft 55 also has a cylindrical cam 59 mounted thereon, contiguous with cam 58 and provided with a slot 61 extending across a portion of its peripheral surface. One side of slot 61 is inclined to form a sloping cam surface 62.

Associated with the cams 57, 59 is a control switch 60 including a flexible spring blade 63 having a contact button 64 mounted thereon and having its outer extremity turned in at right angles to ride over the peripheral surface of both cams. This blade is suitably mounted on a plastic insulating block 65 on which is also mounted blade 66 having a small ear 67 extending outwardly therefrom and carrying thereon a contact button 68 to cooperate with button 64. The outer extremity of blade 66 rests against cylindrical disc 69 also mounted on shaft 55 and rotating therewith. It is to be noted that the diameter of disc 69 is greater than the diameter of the two cams. Blade 66 is biased toward blade 63 so that necessary contact pressure is obtained when contact buttons 64 and 68 are together, and disc 69 serves as a stop limiting motion of blade 66 to allow the contacts to open as required.

Figure 5:
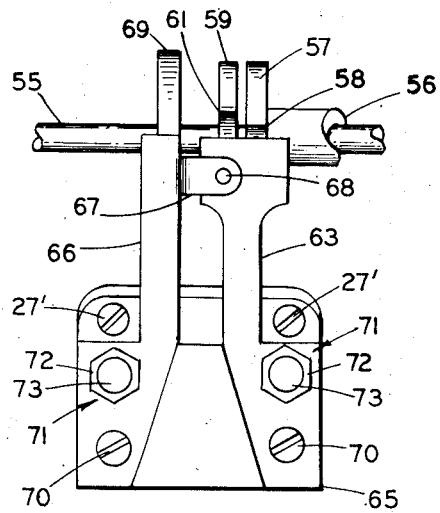
Figure 5 is a view in front elevation of the impulse storing means showing a terminal arrangement slightly different from that shown in Figure 1.
Figure 6:
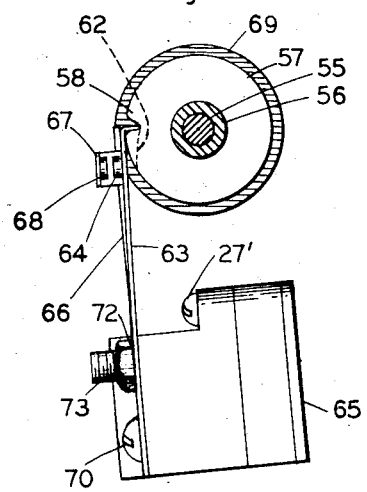
Figure 6 is an end view of the arrangement shown in Figure 5.

The insulating block 65 is identical to the blocks 23, 23' and in the form shown in Figure 1, the blades 63, 66 are mounted thereon by a plurality of screws 70 in a manner similar to the mounting arrangements for blades 19, 21 and 19', 21', the lower screws serving as terminals for connection of suitable external lead wires. The block 65 may be mounted to the main frame by screws 27' passing through suitable apertures on the block, in a manner similar to the mounting arrangements for blocks 23, 23'. In Figures 5 and 6, a slightly different terminal arrangement is shown, in that the upper pair of screws 70 have been replaced by a pair of specially formed screws 71 having hex-heads 72 and threaded studs 73. The studs 73 are intended to accommodate external lead wires having threaded plugs at their extremities.

In the normal position of the parts, the cams 57 and 59 have their corresponding slots aligned thereby permitting the blade 63 to move inwardly, away from the blade 66 a sufficient distance to open the contacts. Upon any motion in the system, the cam 59 will move faster than the cam 57 and the inclined surface 62 will move the blade 63 outwardly to make the contacts 64 and 68 and the contacts will remain closed for all further rotation of the cams in the same direction. The two cams can rotate continuously for a predetermined time and the slots will only be aligned on successive revolutions at a progressively increasing angular distance away from the in-turned end of blade 63, thereby preventing the switch 60 from opening. The arrangement of the cams 57, 59 permits these cams to store impulses as desired and as will be explained in greater detail below and one of the features of the two cam arrangement is the fast action provided thereby. One slotted cam could be used but this would tend to slow the control action somewhat. However, it is to be understood that the invention is not limited to a two cam arrangement.

With the above arrangement of parts in mind, the operation of the device will now be described.

When an impulse is generated by the watthour meter 9, it is transmitted to the impulse responsive means 14 where it is received through the incoming three-wire contact device and then to the motor 39 for energization thereof. At this point, the control switch 60 is open and the circuit to the motor 40 is open, so that the left-hand part of the equipment mounted on rod 38 is at rest. This permits the motor 39 to drive through the differential gear 49 to rotate the cams 57, 59. When this occurs, the relative angular displacement that is quickly developed between the cams operates to close the switch 60 to thereby energize the motor 40. Motor 40 drives its associated contact device to transmit an impulse to the impulse actuating mechanism which, in the embodiment shown, may comprise a printing demand meter of the type shown in U. S. Patent No. 1,742,072, whereby one of the actuating solenoids of the printing device is energized to advance the type wheel one step. By this time, the circuit to motor 39 is broken and it comes to rest, and the gear 47 in a like manner comes to rest. Thus the motor 40 drives through the differential gear 49 in a reverse direction to return the cams 57, 59 to their original position wherein their slots are aligned, thereby opening switch 60. This of course de-energizes motor 40 and makes the device ready for the next incoming impulse.

As impulses are successively generated by the watthour meter, they are successfully transmitted by the three-wire contact device associated with motor 40. The cams 57, 59 continuously operate to normally store and release an impulse so that continuous transmission of impulses occurs without the loss of an impulse at any time.

At the end of a predetermined interval, for example 60 minutes, it is desirable to print the demand measured during the predetermined interval and this is accomplished cyclically each hour by means of suitable clock controlled switches operating externally to the impulse responsive means 14. One of such clock controlled switches is shown at 71 as being normally closed and adapted to open at the end of the demand interval. When it opens, it de-energizes the circuit controlling motor 40 and it also interrupts the pulse transmitting circuit fed by the contact device associated with motor 40. Thus, at the beginning of the next demand interval, no impulses can be transmitted nor can the motor 40 operate to release impulses that are stored by the operation of cams 57, 59. However, the cams 57 and 59 are successively advanced by operation of motor 39 in response to incoming pulses and the two slots in the cams are continuously advanced away from the in-turned end of blade 63. Each successive angular advance of the cams 57, 59 stores one impulse in the accumulator mechanism. Therefore, as impulses continue to come into the device 14 they are continuously stored by the device without the loss of a single one.

Upon completion of the printing and resetting operations of the printing device which may take place in the first 2 minutes of the one hour interval, the clock controlled switch 71 is again closed, which again closes the circuit through the motor 40. During the impulse storing phase of operation, the switch 60 is closed so that upon closure of switch 71 motor 40 immediately starts to drive the cams 57, 59 continuously in a reverse direction to release all impulses stored therein. So long as the motor 39 is at rest, this release of impulses will continue and the cams will be progressively returned to the zero position.

Now assuming that an impulse is generated and sent to device 14 during this impulse releasing cycle of operation, the motor 39 will become energized and tend to drive the gear 49 in opposition to the driving force developed by motor 40. Since the motors are identical and the gear ratios throughout the gear drive are identical, the differential gear 49 will stand still but the motor 40 will send out an impulse corresponding to the impulse received. In other words, for any new impulses coming to the device while impulses are being released by continuous operation of motor 40, such new impulses in effect go right through the device and do not disturb or effect the impulse storing means.

After a short interval of time, all of the impulses stored are released and transmitted, and the device returns to its normal mode of operation wherein one impulse is received and transmitted, leaving no impulses stored during the balance of the demand interval.

The design of the device is such that the cams 57, 59 can accommodate as many as 66 impulses and upon suitable re-arrangement of the cams and the gears greater or fewer impulses could be accommodated in the storing means. With respect to the amount of time required to release all of the stored impulses, it has been found that the maximum number capable of being stored can be released in less than 4 minutes when new impulses are coming in at the rate of 1000 per hour.

Thus there is provided an impulse responsive device that provides regular transmission of impulses at an intermittent rate corresponding to the rate at which they are generated. The motor means actuating the receiving and sending contact devices operate intermittently as does the impulse storing means. When it is desired to store the impulses, the sending motor is de-energized and the sending contacts are rendered ineffective. Upon restoration of normal operation, the transmitting motor operates continuously to rapidly release all stored impulses and at the same time transmit all new pulses generated without the loss of a single pulse in any demand interval.

Although the device has been described in connection with a demand metering system, it is to be understood that it has application in any pulse responsive system wherein it is desirable to interrupt transmisson of pulses while at the same time accumulating or storing all pulses being generated without the loss of a single pulse.

Therefore, while a particular embodiment of the subject invention has been shown and described herein, it is in the nature of description rather than limitation, and it will occur to those skilled in the art that various changes, modifications, and combinations may be made within the province of the appended claims, and without departing either in spirit or scope from this invention in its broader aspects.

What I claim as new and desire to secure by Letters Patent of the United States is:

1. In a demand metering system, electric impulse responsive means adapted to respond to a series of electric impulses being generated at successively spaced intervals of time including first and second rotatably mounted members, said first member having a first position relative to said second member, means for moving said first member to a second position relative to said second member in response to a generated impulse, means for moving said second member to re-establish said first relative position in response to motion of said first member, control means operative after a first time interval to prevent motion of said second member, said first member continuing to move during a second time interval following said first time interval, a third rotatably mounted member, and means to move said third member in a first direction to follow movement of said first member in said second time interval, whereby all impulses generated in said second time interval are stored by the motion of said third member, said control means being operative after said second time interval to permit movement of said second member, said third member moving in a second direction reverse to said first direction after said second time interval, said second member moving after said second time interval to re-establish said first relative position with said first member in response to movement of said first and third members.

2. In a demand metering system, electric impulse responsive means adapted to respond to a series of electric impulses being generated at successively spaced intervals of time including a first rotatably mounted member adapted to be successively moved through a first angular displacement in response to each generated impulse, a second rotatably mounted member adapted to be successively moved through a second angular displacement in response to each generated impulse, first means operative after a first time interval to prevent said second member from moving, said first member continuing to move after said first time interval, and second means operative during a second time interval following said first time interval and adapted to be moved through an angular displacement proportional to the sum of all impulses generated in said second time interval whereby impulses are stored thereby.

3. In a demand metering system, electric impulse responsive means adapted to respond to a series of electric impulses being generated at successively spaced intervals of time including a first rotatably mounted member adapted to be successively moved through a first angular displacement in response to each generated impulse, a second rotatably mounted member adapted to be successively moved through a second angular displacement in response to each generated impulse, control means operative after a first time interval to prevent said second member from moving, said first member continuing to move after said first time interval, and impulse storing means operative during a second time interval following said first time interval and adapted to be moved through an angular displacement proportional to the sum of all impulses generated in said second time interval, said control means being operative upon completion of said second time interval to permit said second member to move again in said manner in response to each impulse generated, said storing means being operative to move through said proportional angular displacement in a reverse direction to release all stored impulses, said second member being adapted to move in response to said reverse displacement of said second means.

4. In a demand metering system, electric impulse responsive means, comprising: Impulse receiving means including a first part moving in response to impulses received, impulse storing means operatively connected to said impulse receiving means and including a second part driven in a first direction in response to motion of said first part, said second part being adapted upon motion to store impulses, impulse transmitting means operatively connected to said impulse storing means and including a third part adapted to move in response to motion of said second part, said third part on moving being adapted to move said second part in a second direction opposite to said first direction, said transmitting means being adapted to transmit one impulse for each impulse stored in said storing means, control means operative after a first time interval to interrupt motion of said third part and to interrupt transmission of impulses from said transmitting means, said second part moving continuously in said first direction to store impulses in response to motion of said first part, and control means operative after a second time interval to restore motion to said third part and to restore transmission of impulses from said transmitting means, said third part moving continuously to transmit all impulses stored in said impulse storing means.

5. In a demand metering system, electric impulse responsive means, comprising: Impulse receiving means including a first part moving in response to impulses received, impulse storing means having differential means operatively connected to said impulse receiving means and including at least one cam driven in a first direction in response to motion of said part and adapted to store impulses therein, impulse transmitting means operatively connected to said differential means and including a second part adapted to move in response to motion of said cam, said second part on moving being adapted to move said cam in a second direction opposite to said first direction, said transmitting means being adapted to transmit one impulse for each impulse stored in said storing means, control means operative after a first time interval to interrupt motion of second part and to interrupt transmission of impulses from said transmitting means, said cam moving continuously in said first direction when said second part is not moving to store impulses in response to motion of said first part, and control means operative after a second time interval to restore motion to said second part and to restore transmission of impulses from said transmitting means, said second part moving continuously to transmit all impulses stored in said impulse storing means, said differential means remaining stationary when both said first and second parts are moving.

6. In a demand metering system, electric impulse responsive means, comprising: Impulse receiving means including a first part moving in response to impulses received, impulse storing means having differential means operatively connected to said impulse receiving means and including a pair of cams driven in a first direction in response to motion of said first part, said cams being driven at different rotative speeds whereby impulses may be stored therein, impulse transmitting means operatively connected to said differential means and including a second part adapted to move in response to relative motion of said cams, said second part on moving being adapted to move said cams in a second direction opposite to said first direction, said transmitting means being adapted to transmit one impulse for each impulse stored in said storing means, control means operative after a first time interval to interrupt motion of said second part and to interrupt transmission of impulses from said transmitting means, said cams moving continuously in said first direction when said second part is not moving to store impulses in response to motion of said first part, and control means operative after a second time interval to restore motion to said second part and to restore transmission of impulses from said transmitting means, said second part moving continuously to transmit all impulses stored in said impulse storing means, said differential means remaining stationary when both said first and second parts are moving.

7. In a demand metering system, electric impulse responsive means, comprising: Impulse receiving means including first motor means moving in response to impulses received, impulse storing means having differential means operatively connected to said first motor and adapted to be driven in a first direction thereby, said impulse storing means including a normally open switch and rotatably mounted switch actuating means adapted to be driven by said differential means to close said switch each time an impulse is received by said first motor means, impulse transmitting means including a second motor means operatively connected to said differential means and adapted to drive said differential means in a second direction opposite the said first direction, said transmitting means including a contact device adapted to transmit an impulse upon motion of said second motor means, and circuit means for energizing said second motor means including said normally open switch and a circuit controller in series therewith, said circuit controller being operative after a first time interval to open said circuit means to deenergize said second motor means and to interrupt transmission of impulses, said switch actuating means moving continuously in said first direction to store impulses in response to operation of said first motor means, said circuit controller being operative after a second time interval to close said circuit means and re-energize said second motor means, said second motor means operating continuously to release and transmit all impulses stored in said impulse storing means, said differential means remaining stationary when both said first and said second motor means are operating.

8. In a demand metering system, electric impulse responsive means, comprising: Impulse receiving means including first motor means and a first contact device actuated thereby, said first contact device including a first pair of switches actuated by said first motor means, one of said switches being opened and the other closed upon actuation thereof, a first motor energizing circuit for energizing said first motor means including in series therewith said first pair of switches, rotatably mounted differential means, first means operatively connecting said first motor means with said differential means to drive said differential means in a first direction, a pair of rotatably mounted contiguous cams having corresponding portions thereof normally in alignment, a first circuit controller having a circuit closure member in a normally open position corresponding to the aligned position of said cams, said cams being rotated at different speeds by said differential means whereby said normally aligned portions are progressively advanced in an angular manner, said closure member moving in response to said angular displacement to close said first circuit controller, impulse transmitting means including second motor means and a second contact device similar to said first contacting device actuated thereby, said second contact device including a pair of alternately operating switches and being adapted to transmit an impulse for each switch closure, a second motor energizing circuit for said second motor means including in series therewith said first circuit controller and a second circuit controller, said second circuit controller being operative after a first time interval to open said second motor circuit means and to interrupt transmission of pulses, said cams being continuously rotated after said operation of said second circuit controller to progressively increase the angular displacement of said aligned portions from said normal position to store impulses therein, said second circuit controller closing after a second time interval to re-energize said second motor means and to restore transmission of pulses from said second contact device, said second motor means operating continuously to progressively release all impulses stored in said impulse storing means, said differential means remaining stationary when both said first and said second motor means are operative.

References Cited in the file of this patent
UNITED STATES PATENTS

| | | |
|---|---|---|
| 2,165,892 | Green | July 11, 1939 |
| 2,730,696 | Davis | Jan. 10, 1956 |